No. 886,650. PATENTED MAY 5, 1908.
C. B. SCHOENMEHL.
BATTERY COVER AND ELEMENT SUPPORT.
APPLICATION FILED MAY 29, 1905.
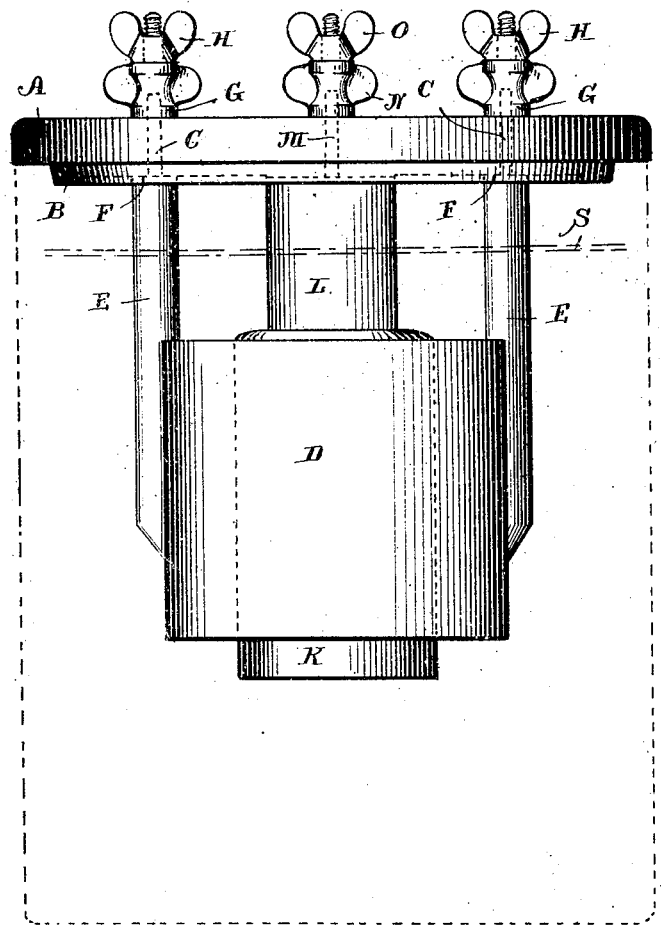
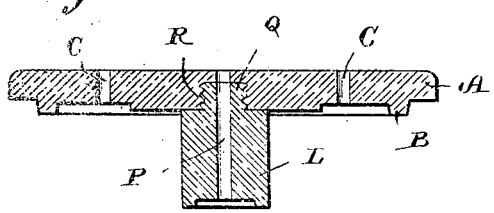
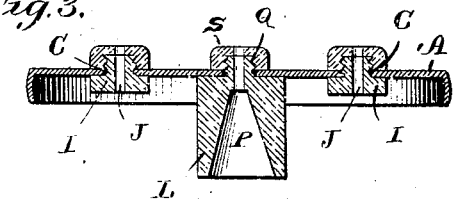
Witnesses
Natalie Newman
Edward T. Nicholson
Inventor
Charles B. Schoenmehl
By Chamberlain & Newman
Attorneys

UNITED STATES PATENT OFFICE.

CHARLES B. SCHOENMEHL, OF WATERBURY, CONNECTICUT.

BATTERY COVER AND ELEMENT SUPPORT.

No. 886,650.  Specification of Letters Patent.  Patented May 5, 1908.

Application filed May 29, 1905. Serial No. 262,953.

*To all whom it may concern:*

Be it known that I, CHARLES B. SCHOEN-MEHL, a citizen of the United States, and resident of Waterbury, in the county of New Haven and State of Connecticut, have invented certain new and useful Improvements in Battery Covers and Element Supports, of which the following is a specification.

My invention relates to an improved construction of battery cover of the types employed to cover and support battery elements within a jar.

It is the purpose of the invention to provide a combined cover and attached insulating sleeve to which different types of elements may be detachably connected and in a way to insulate them from each other; further to provide means for preventing the deposits on the oil covered solution from bridging over from one element to the other and short circuiting the battery. To provide a cover having a detachable sleeve to extend below the solution line, and which is adapted for any of several well known types of elements now upon the market including some of my own design as for instance that shown in the drawings forming a part of this application.

With the above and other minor objects in view my invention resides and consists in the novel construction and combination of parts shown upon the accompanying drawing, upon which similar letters of reference denote like or corresponding parts throughout the several figures, and of which, Figure 1, shows a side elevation of my improved cover complete and having a couple of elements attached thereto as in use, the out-lines of a jar being indicated by dotted lines. Fig. 2, is a central vertical cross section, on a reduced scale, of the cover shown in Fig. 1. Fig. 3, shows a similar sectional view of a slightly modified construction of cover.

In the carrying out of my invention I may construct the cover proper of porcelain, rubber, fiber or metal or any of the well known cover materials, and said cover may be adapted to set in or over the jar as preferred.

In the operation of batteries of this class it is essential that the negative element should be positively retained in substantially the position shown, with relation to both the zinc and cover. Therefore it is necessary to provide an extended support which will firmly hold the element central within the zinc ring and prevent it contacting with the same, and for convenience and cheapness of manufacture I have provided a detachable extension for attachment to the underside of the cover which is formed of insulating material, preferably annular in shape and of a length equal to the desired distance between the cover and negative element.

Referring in detail to the reference characters marked upon the drawings A indicates the cover as a whole, which as indicated in Figs. 1 and 2 is formed of porcelain and contains an annular rib B on its underside to engage the inside of the top edge of the battery jar. This cover also contains holes C—C therethrough for the attachment of the positive element, as for instance a zinc D. The zinc D shown is one of my improved types, comprises a cylindrical or annular body portion adapted to encircle the negative element. It is further provided with suspending rods E—E formed integral therewith, having a reduced end to pass through the holes C before mentioned, and a shoulder F which fetches up against the underside of the cover. A nut G engages the reduced threaded end of each of these rods for the attachment of the same to the cover, and a nut H forms the binding post connection for the field wire, (not shown). If preferred, as in case of the employment of a metal cover, as shown in Fig. 3, I provide a detachable insulating bushing I, which is formed of two parts and has a hole J therethrough for the attachment of a zinc. One of these parts has a reduced threaded end to pass through the hole of the cover and the other a nut to engage and cover said threaded end in a way to clamp the bushing firmly to the cover. The negative element K shown in the middle of the zinc D is a compressed cylindrical element of improved type, and is suspended from the cover and against the extension L by an electrode-supporting rod M secured by nut N and provided with a binding screw O.

The detachable insulating extension is in the form of a depending annular sleeve, which is longitudinally extended as shown in Fig. 1, and serves first as an insulator for the rod M and second as a shoulder or stop against which the negative element is fastened. This extended sleeve like the bushings for the suspending rods of positive elements is made detachable and contains a central hole P therethrough for the rod M before mentioned.

This extended sleeve L may be made detachable by having a reduced threaded upper portion Q to engage a threaded recess R of the cover as shown in Fig. 2, or said threaded upper portion may be made longer and provided with a cap S having a threaded recess and a perforation continuing therefrom and registering with the opening in the sleeve, as seen in Fig. 3. The opening P through the sleeve may be either straight as shown in Fig. 2, or tapered as shown in Fig. 3, to lighten the construction and properly receive the cylinder, rod connections, etc. This sleeve may be of any desired length, but regulated to a degree by the relative location of the position of the zinc. It fixes the position or distance of the element from the cover, and is also made sufficiently broad to form a rigid shoulder for the element secured against its lower end, thus preventing said element from shifting its position and contacting with the zinc. It will also be seen that this sleeve serves as a protective insulator for the rod of the compressed element preventing any possibility of the metallic formation on the surface of the oil covering the solution (see dotted lines S Fig. 1) producing a contact between the poles of the two elements and thereby short circuiting the same.

Having thus described my invention what I claim and desire to secure by Letters Patent is:—

The combination with an electrode, of an electrode-supporting device, comprising a depending longitudinally extended protecting-sleeve having a shouldered and threaded upper portion, a member having a threaded recess extending partially therethrough, and a perforation continuing therefrom and adapted to register with the opening through said sleeve.

Signed at Waterbury, in the county of Fairfield, and State of Connecticut this 22nd day of April, A. D., 1905.

CHARLES B. SCHOENMEHL.

Witnesses:
  C. M. NEWMAN,
  RUTH RAYMOND.